Patented June 15, 1937

2,084,137

UNITED STATES PATENT OFFICE 2,084,137

BODIED TUNG OIL AND PROCESS OF MAKING THE SAME

Theodore H. Geiger, New York, N. Y., and Lothian M. Burgess, Shrewsbury, Mass., assignors to Tung Oil Products, Inc., Newark, N. J., a corporation of New Jersey No Drawing. Application December 16, 1933, Serial No. 702,788

13 Claims. (Cl. 87—12)

Our invention relates to an improved tung or China wood oil as it is variously known, particularly for use as a constituent of or vehicle for paints, varnishes, enamels, lacquers, printing inks, and other surface coating materials. It also relates to a process for preparing improved bodied tung oil. The oil concerned is that which is obtained from the seeds of the tree "Aleurites cordata" and is generally known as China wood oil or tung oil.

The present application is a continuation in part of our former application Serial No. 559,496 filed August 26, 1931 and allowed Dec. 16, 1932.

Tung oil has, and imparts to paints, varnishes and other surface coatings, certain desirable characteristics such as resistance to water and to weather and to many types of corrosive chemical agents or corrosive atmospheric conditions. Raw tung oil is, however, not suitable for use in a varnish or paint, as any material quantity of it causes the surface coating to wrinkle or check on drying, producing a non-transparent film. It must, therefore, be heat bodied or treated before it can be used for a surface coating material.

Heat bodying the oil causes certain changes to take place in it, principally polymerization as a result of which, when properly formulated, it dries in a film without wrinkling or checking or other distortion, while still retaining its valuable water resistant, weather resistant, and corrosion resistant properties. The bodying of tung oil, however, is difficult to carry out due to its tendency to set to a solid gel when heated for comparatively short times to temperatures of around 450° F. or above which are necessary to impart to it the properties desired.

When the oil is heated alone to about 450° F. or above, a polymerization reaction takes place from which heat is evolved which tends to increase the temperature of the oil and this in turn serves to speed the reaction. In a short time the oil sets to a solid gel. In the bodying of tung oil, therefore, it has been necessary to mix it with other varnish constituents or vehicles such as linseed oil or other drying oils, or with gums or resins which dilute the oil. These other constituents act as a retarding medium upon the gelation reaction and by using substantial quantities of them, the oil can be safely heated to 540° F. or even somewhat higher for substantial periods of time. The presence of other materials with the tung oil, however, necessarily, reduces the desirable characteristics of the tung oil and limits its utilization.

In prior practice tung oil is prepared for use in paints and varnishes by heating it in large kettles or pots to temperatures of 450° F. to 565° F. in the presence of substantial quantities of a resin or resin acid. The resin is usually first thoroughly melted and the tung oil then admixed with it. This mixture is subjected to the heat treatment and cooked until the oil and resin are so combined that they will not separate on cooling and will dry to a clear film without checking or cracking. A suitable thinner such as turpentine or oleum spirits is then added usually while the mixture is still warm. A drier is also generally added at this time.

In some instances the tung oil is first heated alone and the resin then added before the polymerization reaction has proceeded too far but in this case great care must be exercised and if large quantities of gas begin to form, the resin must be added at once in order to prevent gelation. It is, therefore, practically impossible to heat the oil alone. In the laboratory, however, it is possible to heat the oil rapidly and also to cool it rapidly so as to prevent gelation and in this way one can study the effect of bodying at high temperatures of 600° F. or above. It has been found that apparently a different type of polymerization reaction takes place at the higher temperatures and that the gelation or solidifying tendency is a property of the lower temperature reaction. This has been suggested by J. Rinse, Rec. trav. chim. 51,529 (1932). The oil produced by the high temperature reaction is different from other bodied oils and has valuable properties but as was pointed out above, it has been impossible to cook the oil at the high temperatures because in merely heating it up enough of the lower temperature reaction takes place to solidify the oil.

We have found that in the presence of an inert medium which does not enter into the bodying reaction and which can be removed after reaction is complete, China wood oil can be heated to temperatures of 600° F. or higher without danger of gelation and the oil can be held at such temperatures for periods of time ranging from a few minutes to several hours. We have further found that when the oil is heated by this method the products are pure bodied China wood oils possessing novel and distinctive properties not found in oil processed in any other known manner. By varying the conditions under which the oil is heated such as temperature, percentage of inert medium, time of heating, etc. tung oil products of widely varying characteristics are produced. These range from bodied oils which dry rapidly to a clear, lustrous film free from checking or frosting and which retain the characteristics of tung oil such as quick drying, water proofness, etc. to bodied oils which are slow drying and not as water-proof but which are similar to bodied linseed oils having the desirable characteristics of the latter oil (good flow, excellent gloss, etc.) when used in enamel products.

The products of our invention can be used in many types of protective coatings where ordinary tung oil is entirely unsatisfactory because of its frosting and wrinkling tendency. Thus the oil can be used to replace linseed oil in paints and in general can be used for any of the products in which drying oils are now used. For many of these uses present tung oils are entirely unsatisfactory and cannot be used at all. In printing inks our product produces a pure tung oil ink which does not react with pigments commonly used and is more water and alkali resistant and is harder and resists rubbing better than inks now used.

It is also to be noted that by our process the specific gravity of the oil is increased on bodying. The raw tung oil has a specific gravity of about .940 and our products range from this point up to about .980. In this respect our product differs from previously reported products made by rapid heating and cooling where the specific gravity was said to be lowered, dropping in some instances as low as .915.

In bodying the China wood oil we first mix it with some inert medium, that is, one that does not enter into the bodying reaction and one that can be removed after the bodying reaction is completed. The inert medium may be of any suitable type, one that dissolves or is dissolved in the tung oil to form a homogeneous solution being preferred. The mixture is then heated to a temperature ranging upward from 500° F. and preferably above 525° F. up to 675° F. or higher as conditions permit and is held at such temperature for times ranging from a few minutes to several hours. The amount of medium, time of heating and temperature all affect the product and each, therefore, depends upon the type of oil which it is desired to produce.

When the bodying reaction has been completed to the desired point the inert medium is removed by any suitable manner such as distillation if the medium is sufficiently volatile or by dissolving it from the tung oil by the use of a solvent that does not dissolve the tung oil itself. We prefer to use a volatile solvent as the inert medium. The amount may vary from 10% to 80% depending upon the product desired but for most purposes from 40% to 60% is sufficient. A solvent such as a hi-flash coal tar naptha with a boiling range of from 300° F. to about 385° F. is satisfactory although many other solvents are equally as good except for considerations such as cost, inflammability, ease of recovery, etc. In general any solvent which does not enter into the reaction, but which prevents gelation and can be completely removed is satisfactory. Solvents such as acetone, toluol, mineral spirits and petroleum naptha have been found satisfactory. In heating a mixture of such a solvent with the oil it is necessary to use an autoclave or to force the oil through a continuous system under sufficient pressure to prevent the solvent from distilling off.

We have found the best method of heating the oil to be in a continuous system. The oil plus solvent is pumped through a stainless steel tube of about ¾-inch inside diameter. The tube is surrounded by electric heating units by means of which the oil can be very rapidly heated to the desired temperature. The oil is then passed into a chamber which also contains heating units so that the temperature can be maintained at any desired point. The oil then passes through a heat exchanger where it is cooled while preheating the cold oil entering the heating system. It then passes through an orifice so that any desired pressure can be maintained in the system. The length of time the oil is heated can be controlled by the rate of flow through the system which is in turn controlled by the pressure and the size of the orifice. The temperature can be controlled closely by means of rheostats on the electric heating coils. Such an apparatus permits exceedingly close control in heating the oil.

The bodied oil which still contains the solvent is then run into a still where the solvent is removed by distillation. Steam distillation is very satisfactory when using hi-flash naptha as the solvent although ordinary distillation can also be used. Vacuum may or may not be applied to remove the last traces of solvent. If it is used the product is a deodorized oil having only a very faint trace of the usual odor of tung oil.

When a small amount of pure raw tung oil is heated to 540° F. it bodies very rapidly and after a short time at this temperature it sets to a gel, which is dry and crumbly and can be cut with a knife without the oil sticking to the blade. This is the basis of a test for the purity of tung oil known as the quality test A. S. T. M. tentative standard (D-12:25T). Under the conditions of this test a pure tung oil solidifies in very close to 8 minutes. Bodying the pure tung oil in any manner heretofore known has only served to shorten this time, that is, if the bodied oils were subjected to the test they formed a gel in a shorter time than 8 minutes usually being from 4 to 5. However, tung oil treated by our process ordinarily requires a longer time to solidify under this test, although this is affected by the temperature, time of treatment and percentage of solvent used, and where the temperature and the solvent percentage are relatively low, an oil may be produced by our process which has a shorter gelation time than 8 minutes, though its time will be longer than a sample of the same oil brought to a like viscosity by heating in usual manner in an open kettle. Our oils range from a time very close to 8 minutes to as high as 150 minutes, depending upon the conditions under which the oil is heated. This factor is important since it means that a pure tung oil can be prepared which can be cooked in a varnish kettle with no danger of gelation. The gel which is finally produced if our oils are heated long enough at 540° F. is sticky and soft and is similar to the type of gel formed by linseed oil rather than by raw tung oil. In fact, our oils which require a long time to solidify in the quality test (50 or more minutes) are much like bodied linseed oils. Thus a long series of oils can be produced ranging from oils much like ordinary tung oil to oils which are much like bodied linseed oil and various combinations of the two types of products can be obtained in the same oil by properly controlling the conditions.

The following is a specific example of our invention:

1. A mixture of 40% of China wood oil and 60% of hi-flash coal tar naptha is pumped through a heating system as described above at a pressure of 350 pounds. Heat is applied by means of electrical heating coils so as to bring the mixture to a temperature of 595° F. within about 2 minutes. The flow of mixture is held constant by keeping the pressure constant and the temperature can therefore be closely controlled. The hot mixture is then passed into a chamber provided with heating coils so that the mixture is maintained at 595° F. and the flow is regulated so that the mixture is in the chamber for about 12 minutes. From the chamber it is cooled rapidly by passing it through a heat exchanger containing the cold mixture flowing to the heating coil. The mixture then passes through an orifice into a still. The solvent is removed by steam distillation, vacuum being applied in order to remove the last traces and also to deodorize the oil.

The resulting oil drys to a clear, hard, lustrous film free from wrinkling or checking. It is non-reactive to many pigments widely used in printing inks such as ultramarine, etc. with which ordinary tung oils cannot be used. The oil has good working qualities in paints and produces good levelling and flowing products having a high gloss while retaining the good water and weather resistance qualities of China wood oil. Its viscosity is about 10 poises which permits the use of large quantities of it in protective coating without the addition of unusually large amounts of thinners.

The drying oil product formed according to the above example has a higher specific gravity, and higher acid number, and a lower iodine number and lower refractive index than the original oil from which it was produced. Thus an oil was produced having a specific gravity of .967, saponification number of 188.8, iodine number of 142.6, refractive index of 1.50450, and acid number of 3.5. These constants particularly the acid number will vary somewhat depending upon the constants of the original oil, which in this case were: specific gravity .942, saponification number 195, iodine number (Wijs) 163, refractive index at 25° C. 1.51775, acid number 3.1. When the product of the above example is heated to 540° F. according to the quality test described above it solidifies in about 13 minutes.

2. A mixture of 60% China wood oil as above and 40% of high flash coal tar naptha is pumped through the same system and in the same manner as described in Example 1. The mixture is heated to 620° F. and the flow regulated so that the mixture is at this temperature for about 25 minutes. It is then treated exactly as described in Example 1.

The resulting oil drys to a clear, hard, lustrous film although it is somewhat slower drying than the product of Example 1. It is very satisfactory for use in enamel products such as those in which a kettle cooked linseed oil is now used. Our product has the properties of excellent flowing and levelling and a high gloss just as bodied linseed oils and in addition retains many of the characteristics of tung oil such as increased durability, etc.

The drying oil product formed according to the above example has a higher specific gravity, and higher acid number, and a lower iodine number and lower refractive index than the original oil from which it was produced. Thus an oil was produced which had a specific gravity of .979, saponification number of 190.3, iodine number of 131.9, refractive index of 1.50140, and acid number of 10.7. When the oil is heated to 540° F. according to the quality test it solidifies in about 55 minutes.

These two examples illustrate the types of products which can be made by our process but the invention is in no sense limited to these examples. The conditions of the heating are so flexible and can be so closely controlled that products of almost any desired constants can be obtained. The effect of temperature, time of heating, and amount of solvent are illustrated in the following table, the characteristics of the oil being again set forth in the first line of the table:

| No. | Percent solvent | Temp. °F. | Time of heating | Viscosity poises | Gel time 540° F. | Iodine No. | Acid No. | Ref. index |
|---|---|---|---|---|---|---|---|---|
| 0 | (1) | | | 2.25 | 8 | 163 | 3.1 | 1.51775 |
| 1 | 30 | 583 | 12' | 33 | 6 | 139.9 | 7.54 | 1.50650 |
| 2 | 30 | 595 | 25' | 75 | 9 | 137.2 | 7.95 | 1.50380 |
| 3 | 40 | 625 | 12' | 52 | 12 | 139.7 | 5.13 | 1.50320 |
| 4 | 40 | 638 | 25' | 41 | 85 | 124.0 | 8.35 | 1.50075 |
| 5 | 40 | 620 | 25' | 32 | 55 | 128.9 | 14.3 | 1.50190 |
| 6 | 50 | 560 | 25' | 53 | 10 | 138.4 | 4.58 | 1.50500 |
| 7 | 50 | 586 | 25' | 55 | 19 | 137.6 | 4.80 | 1.50325 |
| 8 | 50 | 585 | 12' | 30 | 8 | 153.6 | 5.34 | 1.50610 |
| 9 | 60 | 605 | 12' | 16 | 13 | 142.6 | 3.47 | 1.50450 |
| 10 | 60 | 611 | 25' | 32 | 53 | 142.5 | 4.80 | 1.50245 |
| 11 | 75 | 603 | 25' | 15 | 40 | 145.2 | 4.77 | 1.50270 |
| 12 | 75 | 600 | 12' | 10 | 14 | 150.8 | 4.60 | 1.50520 |

¹ Raw sample.

As is to be expected increasing the time of heating increases the viscosity. Increasing the temperature does not always have this effect as is illustrated by sample 4 which was heated to 638° F. and for as long a time as any of the samples but which has a viscosity of only 41 poises. The percentage of solvent has a great influence on the time required for solidification or gelation in the standard test described above. Thus samples 2 and 11 were heated to approximately the same temperature and for the same length of time. Yet one gels in 9 minutes and the other in 40. The iodine number also varies considerably with amount of solvent which is best illustrated by samples 1 and 8.

From an examination of the above table, it will be seen that the conditions of the heating are so flexible and can be so closely controlled that products of almost any desired constants can be obtained. The iodine numbers may vary from that of raw tung oil down to as low as 100 or even lower. The specific gravity may vary between that of raw tung oil to as high as .990. The refractive index may be as low as 1.4990 and the acid number may increase to 15 or even higher. All of the constants depend upon the conditions of heating and the percent of solvent. The solvent may vary from 10% to 80%, the temperature from 505° F. to 675° F., the pressure from 10 pounds to 400 pounds or any pressure necessary to prevent distillation of the solvent or other material used as inert medium.

It is clear from this discussion that the products of our invention are distinctly different from previously known bodied tung oils. The fact that tung oils treated by our process do not gel in as short a time as do raw or ordinary bodied tung oils when heated to 540° F. indicates that the type of polymerization reaction taking place in our process is different from that which occurs when tung oil is bodied at atmospheric pressure without the presence of the distending medium. The polymerization of tung oil is different from that of any other drying oil because it is constituted largely of the glyceride of eleostearic acid which contains a conjugate system of double bonds. It has been suggested by others that tung oil can undergo two types of polymerization. The first type is the ordinary polymerization of a conjugate system which proceeds at the comparatively lower temperatures and rapidly solidifies the oil. The second type takes place at higher temperatures and is probably more of an association type of reaction such as takes place in the bodying of linseed oil. It is our belief that when tung oil is treated by our process, the second type of polymerization occurs to a considerable extent even at lower temperatures and that probably the first type is inhibited by the inert medium the gelation reaction thereby being slowed down and modified or even substantially prevented. In other words, our process produces such a definitely different proportioning of reaction products as compared with usual practice that the product is quite distinct.

The temperature at which the non-gelling type of polymerization first occurs cannot be ascertained with great definiteness because it also depends very much on the amount of inert medium used. Perhaps it occurs to a theoretical extent at a temperature in the order of about 500° F. or lower but its effects in actually lengthening gelation time are not appreciable until temperatures in the order of about 550° F. are obtained. If the tung oil is heated to that temperature in the presence of the inert distending medium and held at such temperature for a reasonable length of time, its tendency later to gel when heated after the removal of the diluent will be reduced. This effect progressively increases at higher temperatures and with increasing amounts of inert medium until at a temperature of about 620° to 675° F. (depending upon the amount of inert medium) the gelation reaction seems to be entirely inhibited, and our product does not have as much tendency to gel on heating as do heat bodied linseed oils of the same or even lighter viscosity. We do not wish to limit our process to a maximum temperature of 675° F. and it is to be understood that higher temperatures can be used if the equipment and inert medium will stand the same.

At the lower end of the temperature range (between 500° and 550° F. and preferably above 525° F.) the effect on increase of gelation time under the standard test is less noticeable, but even at these lower temperatures there are some valuable improvements particularly if a high percentage of solvent is used, for it is possible to obtain a somewhat increased viscosity and accompanying benefits as indicated for example by the fact that the oil will dry to a smooth unwrinkled film, without decreasing the gelation time as would be the case with oil heat bodied in the ordinary manner.

It is not possible with the evidence available to say definitely just what does happen when tung oil polymerizes, in the usual ways now known, but it appears to us likely that an actual polymerization such as is undergone by conjugate systems of double bonds takes place rather than some form of association because of the extreme rapidity of the reaction, the great amount of heat liberated when the oil gels and the physical characteristics of the gel produced. A reaction based upon the usual mechanism for the polymerization of conjugate double bonds will also explain the change in iodine number which takes place and also will explain the great increase in viscosity with little change in iodine number which takes place just before the oil gels.

In any event, the elimination or slowing down of gelation at a temperature of 540° F. shows that tung oils bodied according to our process have undergone a very different mechanism of reaction from those which are heated without a diluent at atmospheric pressures, and shows that this invention is not limited to a method of controlling the bodying of tung oil but that an actual new product has been formed in which th oil has been bodied without the usual type of reaction undergone by conjugate systems and with the formation of a new structure having double bonds which react to heat in the same manner as those of bodied linseed oils.

The data of the table above show the way in which our controlled polymerization tends to inhibit the type of polymerization leading to gelation and further indicates that by our process these two types of polymerization can be controlled so that the desired amount of either one can be obtained without too much of the other. Oil bodied so as to have a predominance of the non-conjugate reaction should have characteristics somewhat like those of a bodied linseed oil and an examination of sample 4 of Table I shows that this is the case. This oil dries more slowly than tung oil with no frosting or wrinkling even though no drier is used; its iodine number is about the same as a heat bodied linseed oil of the same viscosity, and its acid number increases on heating just as is the case with linseed oil. When a gel ultimately is formed from the oil, such gel is sticky and rubbery like the linseed gels and not dry and crumbly like the tung oil gels. Even an oil like number 6 of Table I which gels in 10 minutes when heated to 540° F. showing that it has some of the characteristics of ordinary tung oil has undergone a considerable amount of the non-conjugate type of reaction since raw tung oil bodied to the same viscosity without solvent would gel in about 5 minutes. Thus a series of oils can be prepared having reaction characteristics which will range from an oil only slightly modified from pure tung oil to an oil approximately equivalent to bodied linseed oil. In addition to these differences from ordinary bodied tung oils, our process has the desirable features of very closely controlled cooking and the products have new and valuable properties.

In paints our invention permits the use of tung oil without the hitherto prohibitive defect of wrinkling, etc. The excellent waterproofing and weather resistant qualities of the tung oil can thus be utilized. In addition the paints have better flowing and levelling properties than most products now used. The gloss is excellent and the working qualities which eliminate many bodied oils from consideration as paint materials are good. The oil is non-reactive with most pigments and has excellent wetting properties. There is very little tendency for pigments to settle out of the paints and they are extremely hard and durable.

In printing inks our products are non-reactive to the sulphide pigments which are used widely for alkali resistance. Thus the alkali resistance of the tung oil can also be utilized with these pigments which cannot be used with ordinary processed tung oils. In addition our products have unusually good working qualities and produce a harder ink which does not rub off easily and which is far more water and alkali resistant than inks now produced.

In enamels our products will produce a gloss equal to the very best bodied linseed oils and will retain the gloss better than the latter oils while at the same time it is much more water and alkali proof.

In general by our process China-wood oil can be made adaptable to almost the whole range of uses for drying oils while retaining the qualities which make it unique as a drying oil.

It will be understood that the specific details of apparatus and method hereinbefore set forth are for the purpose of illustration and are not intended to be regarded as limitations upon the scope of the invention, except as contained in the following claims.

What we claim is:

1. A process of bodying tung oil which comprises heating tung oil in the presence of a removable inert diluent miscible therewith to a temperature in excess of 500° F. and not above a temperature adversely affecting the oil for a time sufficient to effect an appreciable thickening of the oil, and thereafter removing said diluent.

2. A process as specified in claim 1, in which the temperature is above 525° F. and not over about 675° F.

3. A process as specified in claim 1, in which the temperature is above 540° F. and not over about 675° F.

4. A process as specified in claim 1 which includes the further step of removing such diluent by distillation.

5. A process as specified in claim 1, in which the material under treatment is confined while heated to prevent evaporation of the diluent and in which the diluent is thereafter removed by evaporation.

6. A process as specified in claim 1 in which the diluent is a volatile solvent for the oil and is removed by evaporation.

7. A process as specified in claim 1, in which the diluent amounts to more than 10% of the oil by weight.

8. A process as specified in claim 1 in which the diluent is a solvent and amounts to at least 30% by weight of the oil.

9. A process of treating tung oil which comprises adding to the tung oil a substantially inert solvent therefor in quantity in excess of 30% by weight and heating the oil and solvent under conditions adapted to prevent substantial evaporation and at a temperature of at least 540° F. and below a temperature at which the oil is decomposed until the oil is substantially thickened, and thereafter substantially separating the solvent from the treated oil.

10. A process of bodying tung oil which comprises mixing said tung oil with a volatile solvent, heating said mixture to within a temperature range of from about 525° F. to 675° F. for a time sufficient to effect an appreciable thickening of said oil while maintaining said solvent admixed therewith, and thereafter evaporating said solvent from the resulting oil, and completing the removal by blowing air through said oil.

11. A process of bodying tung oil which comprises mixing tung oil with a volatile solvent, heating said mixture to within a temperature range of from about 525° F. to 675° F. for a time sufficient to effect an appreciable thickening of said oil, while confining it to prevent evaporation of the solvent, and thereafter removing said solvent by distillation.

12. A process of bodying tung oil which comprises mixing tung oil with an extractible inert ester of a fatty acid, heating said mixture to within a temperature range of from about 525° F. to about 675° F. for a time sufficient to effect an appreciable thickening of said oil while said ester is mixed with said oil, and thereafter dissolving said ester from said bodied tung oil.

13. A process of bodying tung oil which comprises heating tung oil with an inert solvent in amount equal to upwards of 10% of said mixture within a temperature range of about 525° F. to 675° F. for a time sufficient to effect an appreciable thickening of said oil while maintaining said inert solvent in intimate contact with said tung oil, thereafter removing said inert solvent, and controlling the percentage of said inert solvent and the time and temperature of heating to modify the viscosity, iodine number and acid number of said tung oil.

THEODORE H. GEIGER.
LOTHIAN M. BURGESS.